United States Patent
Brahm et al.

(10) Patent No.: US 11,029,145 B2
(45) Date of Patent: Jun. 8, 2021

(54) PROJECTION DEVICE AND PROJECTION METHOD

(71) Applicant: Fraunhofer-Gesellschaft zur Förderung der angewandten Forschung e.V., Munich (DE)

(72) Inventors: Anika Brahm, Jena (DE); Claudia Reinlein, Jena (DE); Ingo Gebhart, Jena (DE)

(73) Assignee: Fraunhofer-Gasellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/423,814

(22) Filed: May 28, 2019

(65) Prior Publication Data
US 2019/0360799 A1    Nov. 28, 2019

(30) Foreign Application Priority Data
May 28, 2018   (DE) ................... 10 2018 208 417.3

(51) Int. Cl.
*G01B 11/25* (2006.01)

(52) U.S. Cl.
CPC ...... *G01B 11/2518* (2013.01); *G01B 11/2513* (2013.01)

(58) Field of Classification Search
CPC ....... G01B 11/24; G01B 11/22; G01B 11/026; G01B 11/2518; G01B 11/2513;
(Continued)

(56) References Cited

U.S. PATENT DOCUMENTS

| 4,725,144 A | 2/1988 | Nelson et al. |
| 6,028,672 A | 2/2000 | Geng |

(Continued)

FOREIGN PATENT DOCUMENTS

| DE | 69123300 | 4/1997 |
| DE | 19633686 | 2/1998 |

(Continued)

OTHER PUBLICATIONS

"German Office Action Serial No. 102018208417.3 dated Sep. 20, 2018", 6 pgs.
(Continued)

*Primary Examiner* — Hoa Q Pham
(74) *Attorney, Agent, or Firm* — Schwegman Lundberg & Woessner, P.A.

(57) ABSTRACT

A projection device can include: an illuminating unit for emitting light; and a projection unit having a mirror surface, the projection unit being designed to project the light emitted by the illuminating device by means of the mirror surface into an object space and to shape it into different spatially structured light patterns in the object space. The projection device is distinguished in that the mirror surface is deformable, at least in regions, and in that the projection unit, for forming the different spatially structured light patterns in the object space, has at least one actuator for deforming the mirror surface, at least in regions. The present subject matter furthermore relates to a projection method, to a device, and to a method for detecting a three-dimensional contour.

19 Claims, 4 Drawing Sheets

(58) Field of Classification Search
CPC .............. G01B 11/007; G01B 11/0608; G01B 11/2441; G01B 9/02004; G01B 9/02044; G01B 9/02091; G01B 9/0209; G01B 9/02035; G01B 9/02063; G01B 9/02064; G01B 2290/35; G01B 11/005
USPC .................................................. 356/601–623
See application file for complete search history.

(56) References Cited

U.S. PATENT DOCUMENTS

| | | | |
|---|---|---|---|
| 6,040,909 | A | 3/2000 | Hasegawa et al. |
| 6,611,343 | B1* | 8/2003 | Frankowski ........... G01B 11/25 356/601 |
| 7,518,780 | B2* | 4/2009 | Papavasiliou ...... G02B 26/0841 359/290 |
| 10,241,326 | B2* | 3/2019 | Wang ................. G02B 27/0068 |
| 2003/0184887 | A1* | 10/2003 | Greywall ........... G02B 26/0825 359/846 |
| 2004/0184163 | A1* | 9/2004 | Nishioka ............ G02B 17/0896 359/726 |
| 2004/0245338 | A1* | 12/2004 | Poloniewicz ...... G06K 7/10653 235/454 |
| 2005/0023356 | A1* | 2/2005 | Wiklof ............... G06K 7/10564 235/462.42 |
| 2011/0122900 | A1* | 5/2011 | Sibbett .................... H01S 3/105 372/25 |
| 2017/0276471 | A1* | 9/2017 | Jiang .................. G01B 9/02068 |

FOREIGN PATENT DOCUMENTS

| | | |
|---|---|---|
| DE | 69528554 | 3/2003 |
| DE | 102011010265 | 8/2012 |
| DE | 102011014779 | 9/2012 |
| DE | 102012002161 | 8/2013 |
| DE | 102012013079 | 4/2014 |
| DE | 102013013791 | 3/2015 |
| DE | 102015208285 | 11/2016 |
| WO | 2006109308 | 10/2006 |
| WO | 2015022384 | 2/2015 |

OTHER PUBLICATIONS

Bosel, Christoph, "Ray mapping approach for the efficient design of continuous freeform surfaces", Optics Express 24, (2016), 14271-14282.

Zhang, Song, "Recent progresses on real-time 3D shape measurement using digital", Optics and Lasers in Engineering 48, (2009), 10 pgs.

* cited by examiner

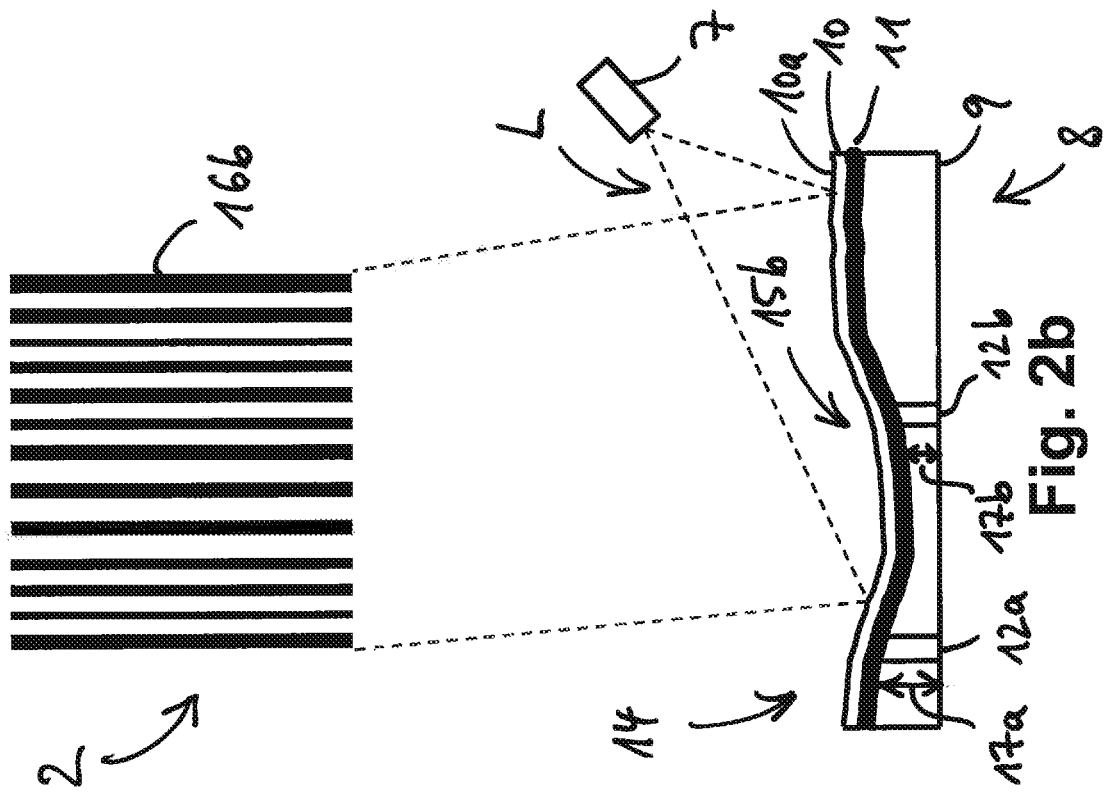
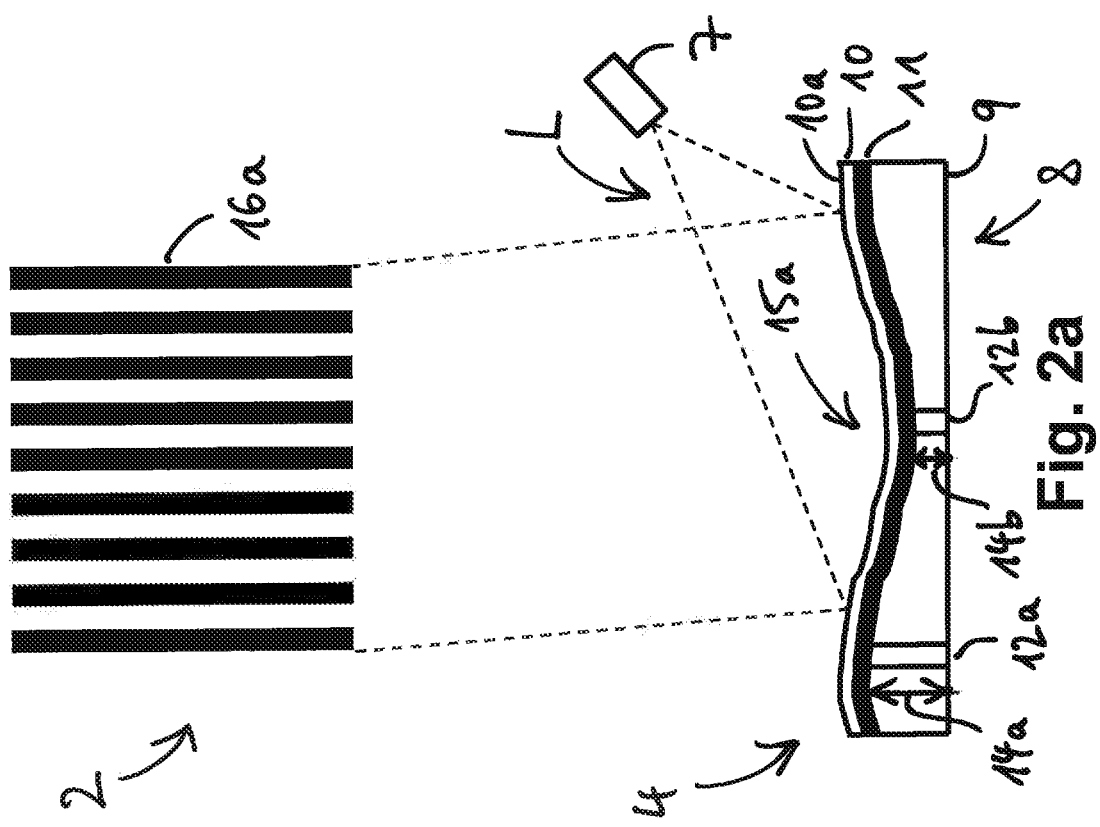

PROJECTION DEVICE AND PROJECTION METHOD

CLAIM FOR PRIORITY

This application claims the benefit of priority of German Application No. 10 2018 208 417.3, filed May 28, 2018, which is hereby incorporated by reference in its entirety.

TECHNICAL FIELD

This document relates primarily to a projection device and a projection method. The document furthermore relates to a device for contactless detection of a three-dimensional contour that contains the aforesaid projection device, and to a method for contactless detection of a three-dimensional contour that comprises the method steps of the aforesaid projection method.

BACKGROUND

For an example of detecting three-dimensional contours, see, e.g., ZHANG, Song: *Recent progresses on real-time 3D shape measurement using digital fringe projection techniques. In: Optics and Lasers in Engineering* 48 (2010) Nr. 2, pp. 149-158.

One or two cameras (e.g. in a stereovision arrangement) can be used to observe an object. The object may be illuminated, e.g., by means of sequential or continuous pattern projection methods. Examples of such methods are binary code, phase-shift, grid, speckle, and hybrid methods). With knowledge of the geometry of the system, it is then possible, using the images of the object recorded by means of the cameras, to reconstruct or calculate by means of triangulation a three-dimensional contour of the object with the structured light patterns projected onto the surface of the object.

The devices and methods for projecting the structured light patterns onto the three-dimensional contour to be measured thus represent a significant aspect. These projection devices and methods frequently determine to a large extent the application scenario and the reconstruction results.

For example, DE102011010265A1 and DE19633686C2 are directed toward projection devices that produce a defined intensity distribution in the object space or measurement volume by means of tilting micromirrors according to the principles of reflection and deflection of light. Absorbing optical components such as liquid crystal displays (LCD, LCOS, slides, or masks) can be used for projecting structured light patterns.

DE102012002161A1 is directed toward projection devices that, e.g., shape light emitted by a laser into statistical patterns, in particular in the form of speckle patterns, by means of a diffusion disk and an acoustooptical modulator.

DE102013013791A1 mentions such projection by means of microlens arrays.

DE102015208285A1 mentions a projection method in which a pattern wheel made of metal is used as a structuring element. Alternatively, it is also possible to use glass with a chromium coating.

U.S. Pat. No. 6,028,672A mentions the projection of structured light patterns by means of diffractive elements.

DE102011014779A1 is directed toward a device for measuring distances and/or spatial coordinates of an object with a freeform optics unit that is designed such that light emitted by an illuminating unit is deflected into an object plane by means of a freeform surface of the freeform optics unit in a spatially structured light pattern.

SUMMARY/OVERVIEW

Each of these projection devices and projection methods normally has at least one of the following drawbacks, however:

They include a plurality of optical components for beam guidance, beam shaping, and projection. This increases the amount of work required for adjustments, costs, and complexity of the system.

They do not work loss-free; e.g., power losses of up to 50 percent through optical components, for example in the form of masks or slides, may occur during transmission of the light used for producing the structured light pattern.

Each is suitable only for projecting a fixed light pattern type that is defined by the optical components used. To vary the projection pattern, for example masks, slides, or other optical components must then be moved in a translatory or rotary manner by means of a drive, the light pattern type often remaining unchanged, however. This may also significantly increase the complexity of the system.

Each is suitable only for a limited light wavelength range, e.g., only for the visible spectrum (VIS) or for the near-infrared spectrum (NIR). Frequently a switch from the UV spectrum to the IR spectrum, or vice versa, required by the optical components used for beam formation and by their transmission behavior as a function of wavelength, is not possible, or is only possible with limitations.

There is therefore a need for projection devices and projections methods that are suitable for projecting light from as broad a spectrum as possible, that have the lowest possible optical power losses, and that may be produced or executed in the least possible time and with the least possible costs. In addition, these projection devices and methods should be suitable for projecting as large a number of different structured light patterns as rapidly as possible so that they may be used, e.g. in methods for contactless detection of three-dimensional contours of movable or rapidly movable objects.

The present subject matter provides a projection device and a projection method as well as a device and a method for contactless detection of a three-dimensional contour that accomplish this.

The present subject matter discloses, among other things, a projection device comprising:
 an illuminating unit for emitting light; and
 a projection unit having a mirror surface, the projection unit being designed to project the light emitted by the illuminating device by means of the mirror surface into an object space and to shape it into different spatially structured light patterns in the object space.

The projection device can be distinguished in that the mirror surface is deformable, at least in regions, and in that the projection unit, for shaping the different spatially structured light patterns in the object space, has at least one actuator for deforming the mirror surface, at least in regions.

The projection device disclosed by the present subject matter has a particularly low degree of complexity, since, apart from the deformable mirror surface, additional optical components for beam shaping or beam guidance are not necessarily required. The projection device of the present subject matter can thus be compact, simple to adjust, stable, and may be manufactured relatively quickly and cost-effectively.

Since projecting the spatially structured light patterns is only accomplished or may only be accomplished using reflection on the mirror surface, the projection device is furthermore suitable for projecting light from a broad wavelength range. For example, when a suitable material for the mirror surface is selected, it is not necessary to adapt the projection unit if the wavelength of the light that is used for shaping the spatially structured light patterns is changed from UV to IR. In addition, compared to methods in which transmitting optical elements are used for shaping light patterns, shaping the spatially structured light patterns by means of reflection is particularly low in losses and thus is particularly efficient. Thus e.g. light sources with lower power may be used without losses in quality. This may reduce operating costs and extend the service life in particular of the light source.

Since shaping the different spatially structured light patterns in the object space is accomplished or may be accomplished only by deforming the mirror surface, a large number of different structured light patterns may be projected very rapidly and with a low expenditure of energy without the need for complex changes in the projection device. For example, when using appropriate actuators, sequences of different structured light patterns may be projected at projection frequencies in the kHz range. Depending on the geometry of the projection process, it may be sufficient e.g. to deform the mirror surface only by a few micrometers or even by a few nanometers in order to adequately shape different spatially structured light patterns in the object space. In particular, as a rule the shaping of the different spatially structured light patterns by deforming the mirror surface is also particularly easily reproducible.

The actuator can thus be embodied such that it may selectively be brought at least into a first position and into a second position. The at least one actuator and the mirror surface are then arranged and embodied such that, when the at least one actuator is in the first position, the mirror surface assumes a first surface shape, and in that, when the at least one actuator is in the second position, the mirror surface assumes a second surface shape that differs from the first surface shape. If the mirror surface assumes the first surface shape, it is designed to shape light emitted by the illuminating unit in a first spatially structured light pattern in the object space. And if the mirror surface assumes the second surface shape, it is designed to shape light emitted by the illuminating unit in a second spatially structured light pattern in the object space, the second spatially structured light pattern differing from the first spatially structured light pattern.

However, the at least one actuator can be configured to be moved into a plurality of more than two different positions. For example, the actuator may be continuously adjustable. The different positions of the actuator may be defined, for example, by different spatial extensions of the actuator or may correspond thereto. Normally the at least one actuator is arranged and embodied such that it is adjustable in a direction perpendicular or largely perpendicular to the mirror surface, or in a direction perpendicular or largely perpendicular to the region of the mirror surface on which the actuator acts or to which it is adjacently arranged.

Thus, it is possible for the at least one actuator to comprise at least one piezo element, at least one linear motor, or at least one mechanical actuating unit that may be driven by a linear motor. The projection unit may also in particular comprise a plurality of actuators. The actuators may then be adjustable or controllable independent of one another. For example, the actuators may be arranged rotationally symmetrical with respect to an axis of rotation. The axis of rotation may be arranged or designed such that it intersects the mirror surface. If the projection unit comprises more than one actuator, these actuators may be arranged, e.g. such that the shortest interval between adjacent actuators is less than 10 mm, less than 5 mm, less than 1 mm, less than 0.5 mm, or less than 0.1 mm. For example, the actuators may be embodied as microelectronic or microelectromechanical components and may be produced using optical methods, in particular using optical lithography methods.

The deformable mirror surface for shaping the different spatially structured light patterns may be embodied as a freeform mirror surface. The freeform mirror surface may be provided by any continuous, continuously differentiable, or at least section-wise continuously differentiable surface. The three-dimensional contour of the freeform mirror surface that is required for shaping a desired spatially structured light pattern in the object space may be calculated based on the embodiment of the illuminating unit and the arrangement of the illuminating unit and the freeform mirror surface relative to one another, in particular based on the beam guidance of the light emitted by the illuminating unit and reflected on the freeform mirror surface. Appropriate methods for calculating the three-dimensional contour of the freeform mirror surface are described, for example, in: BÖSEL, Christoph; GROSS, Herbert: *Ray mapping approach for the efficient design of continuous freeform surfaces.* In: Optics Express 24 (2016) Nr. 13, pp. 14271-14282.

The mirror surface may have, e.g., microstructuring for shaping high-frequency structures of the spatially structured light pattern. This may mean that the mirror surface has height varations or local height varations perpendicular to the mirror surface that may be up to 10 µm, up to 20 µm, up to 50 µm, up to 100 µm, up to 200 µm, or up to 500 µm. Additionally or alternatively, these height variations or local height variations may have an amplitude of at least 0.5 µm, of at least 1 µm, of at least 5 µm, of at least 10 µm, of at least 20 µm, of at least 50 µm, or of at least 100 µm in a direction perpendicular to the mirror surface, for example. These height variations in the mirror surface may have dimensions parallel to the mirror surface of up to up to 100 µm, up to 200 µm, up to 500 µm, up to 1 mm, up to 5 mm or up to 10 mm.

The projection unit may have a substrate layer, in particular a metal substrate layer, for embodying the mirror surface. In other words, the mirror surface may be formed by a substrate layer, in particular a metal substrate layer, or by a surface of this substrate layer. A thickness of this substrate layer may be, e.g., at most 1 mm, at most 0.5 mm, or at most 0.2 mm.

On a back side of the substrate layer facing away from the mirror surface, the projection unit may have at least one connecting element or at least one connecting layer. The at least one connecting element or the at least one connecting layer may be arranged between the at least one actuator and the substrate layer to transmit a deforming force from the at least one actuator to the substrate layer. The at least one connecting layer may comprise, e.g., at least one adhesive layer or at least one metal layer. If the connecting layer is embodied as a metal layer, it may in particular be embodied as a metal film or solder layer. The connecting elements may also be made of adhesive or metal or may comprise adhesive or metal.

The illuminating unit may comprise, for example, at least one LED and/or at least one laser. However, it is understood that the illuminating unit may also comprise other light sources. Due to its high spatial coherence, laser light permits, e.g., particularly precise shaping of the spatially structured light patterns to be projected. However, it is also possible for the illuminating unit to comprise other optical elements for beam shaping or beam collimation, for instance one or more mirrors, one or more lenses, one or more optical switches, or the like.

Furthermore suggested is a device for contactless detection of a three-dimensional contour comprising:
  a projection device of the type described in the foregoing;
  at least one camera, preferably a first camera and a second camera, for recording images of an object arranged in the object space with the different spatially structured light patterns projected onto the object by means of the mirror surface; and,
  an evaluation unit for determining a three-dimensional contour of an object arranged in the object space based on image data from images of the object recorded by means of the at least one camera, preferably from images of the object recorded by means of the first camera and the second camera, with the different spatially structured light patterns projected onto the object by means of the mirror surface.

The device may furthermore comprise a control unit that is designed to control the at least one actuator such that the at least one actuator deforms the mirror surface for shaping the different spatially structured light patterns in the object space. The control unit can furthermore be configured to control the at least one camera, preferably to control the first camera and the second camera, and where necessary also to control the illuminating unit. The control unit may then be configured to control the at least one actuator and the at least one camera, preferably the first camera and the second camera, such that the at least one camera, preferably the first camera and the second camera, for each spatially structured light pattern of the plurality of different spatially structured light patterns that are projected by means of the mirror surface onto an object arranged in the object space, records at least one image of the object with the spatially structured light pattern projected onto the object.

In particular, for detecting or calculating the three-dimensional contour of the object arranged in the object space, the evaluation unit may be designed, for a plurality of object points of the object, based on the image data of the images recorded by means of the at least one camera, preferably based on the image data of the images recorded by means of the first camera and the second camera,
  to identify pairs of points corresponding to one another and to the specific object point in an image plane of the camera or of the first camera and in another plane, wherein the other plane
    a) is an image plane of the second camera, or,
    b) is a virtual projection plane associated with the mirror surface,
  and
  to determine depth information using triangulation depending on positions of the points corresponding to one another and the specific object point in the image plane and in the other plane.

Identifying the pair of points corresponding to one another and to the specific object point in the image plane and in the other plane may be accomplished in a known manner. For example, a sequence of brightness values or possibly a sequence of color values may be associated with every point in the image plane and in the other plane based on the sequence of images recorded by means of the at least one camera, wherein the values of the sequence of brightness values or of color values associated with the specific point corresponds to the brightness values or color values detected in the sequence of images at this point.

A given point in the image plane of the camera or of the first camera may then be identified, e.g. with a point in the other plane corresponding to this point, in that first the epipolar line in the other plane that corresponds to the given point in the image plane of the camera or of the first camera is determined. In the next step, for each point located on this epipolar line, in the other plane the sequence of brightness values or of color values may be correlated to the sequence of brightness values or of color values associated with the given point on the epipolar line may be correlated to the sequence of brightness values or color values that is associated with the given point in the image plane of the camera or of the first camera. Then, e.g. the point on the corresponding epipolar line in the other plane for which this correlation has a maximum value is identified as the point in the other plane that corresponds to the given point in the image plane of the camera or of the first camera. Possible implementations of portions of this method are described in WO2015022384A1 and DE102012013079A1, for example.

In this way the evaluation unit for each of the plurality of object points that are disposed on the three-dimensional contour of the object may determine three spatial coordinates that define the position of this object point in the space. The evaluation unit may then at least approximately reconstruct the three-dimensional contour of the object from these three-dimensional spatial coordinates of the plurality of object points. The evaluation unit may additionally use e.g. additional known interpolation or smoothing algorithms.

Also described is a projection method that comprises at least the following steps:
  Shaping a first spatially structured light pattern in an object space by reflecting light on a mirror surface having a first surface shape;
  Deforming, at least region-wise, the mirror surface so that the mirror surface assumes a second surface shape different from the first surface shape; and,
  Shaping a second spatially structured light pattern in the object space that is different from the first spatially structured light pattern by reflecting light on the mirror surface having the second surface shape.

Deforming the mirror surface may be accomplished by means of at least one actuator, preferably by changing a piezo voltage of a piezo element or by adjusting a linear motor. For deformation, at least region-wise, of the mirror surface, the linear motor may be coupled to the mirror surface e.g. via a mechanical actuating unit. For deforming the mirror surface, the latter may be deformed at different positions of the mirror surface, in particular simultaneously. For example, the mirror surface may be deformed at different positions of the mirror surface arranged rotationally symmetrical to one another.

Furthermore described is a method for contactless detection of a three-dimensional contour that comprises at least the following steps:
  Projecting different spatially structured light patterns onto an object arranged in an object space, specifically according to the projection method described in the foregoing;
  Recording images of the object with the different spatially structured light patterns projected onto the object by means of at least one camera, preferably by means of a first camera and a second camera; and, Determining a three-dimensional contour of the object based on image data of the images recorded by means of the at least one camera, preferably based on image data of the images recorded by means of the first camera and the second camera.

In the method for contactless detection of a three-dimensional contour, the deforming of the mirror surface for shaping the different spatially structured light patterns and the recording the images of the object by means of the at least one camera, preferably by means of the first camera and the second camera, may be accomplished synchronously in that the at least one camera, preferably the first camera and the second camera, for each of the plurality of different spatially structured light patterns that is projected onto the object, records or record at least one image of the object with the spatially structured light pattern projected onto the object.

Furthermore, in the method for contactless detection of a three-dimensional contour, for a plurality of object points of the object, based on the image data of the images recorded by means of the at least one camera, preferably based on the image data of the images recorded by means of the first camera and the second camera, Pairs of points corresponding to one another and to the specific object point in the image plane of the camera or of the first camera and in another plane are identified, wherein the other plane
a) is an image plane of the second camera, or,
b) is a virtual projection plane associated with the mirror surface,
and
Depth information is determined using triangulation depending on positions of the points corresponding to one another and to the specific object point in the image plane and in the other plane.

Identifying points corresponding to one another in the image plane of the camera or of the first camera and in the other plane may be explained e.g. in the manner described above (see e.g. WO2015022384A1).

BRIEF DESCRIPTION OF THE FIGURES

Exemplary embodiments of the devices and methods described herein are illustrated in the drawings and are explained in greater detail in the following description.

FIG. 2a schematically depicts the projection device from FIG. 1, wherein for projecting a first structured light pattern the deformable mirror surface is deformed such that it assumes a first surface shape;

FIG. 2b schematically depicts the projection device from FIG. 2a, wherein for projecting a second structured light pattern the deformable mirror surface is deformed such that it assumes a second surface shape;

DETAILED DESCRIPTION

Figure 1:
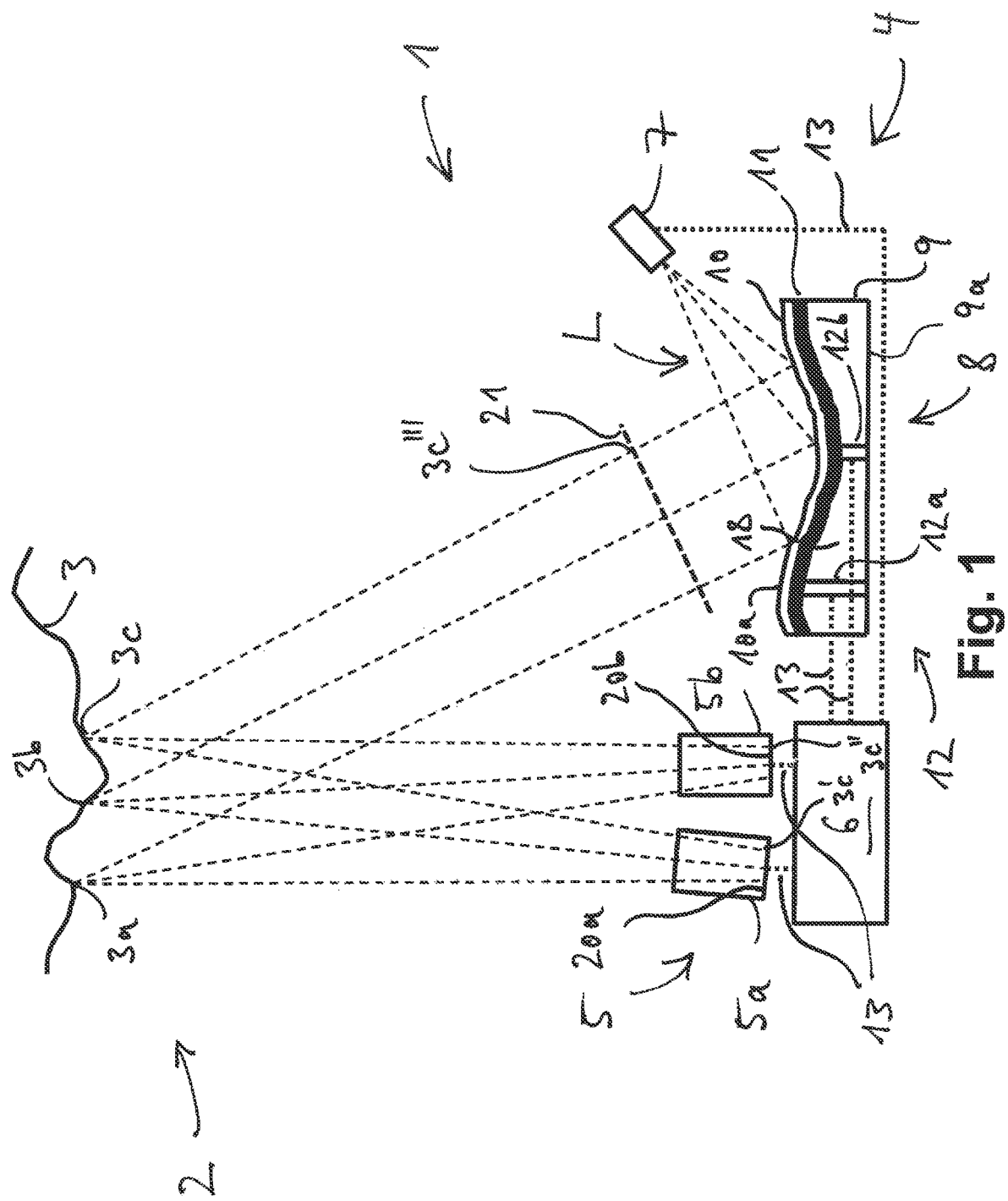
FIG. 1 schematically depicts a device for contactless detection of a three-dimensional contour, wherein the device for contactless detection of the three-dimensional contour has a projection device having a deformable mirror surface.

FIG. 1 is a schematic depiction of a device 1 for contactless detection or measurement of a three-dimensional contour 3 arranged in an object space 2. The device 1 comprises a projection device 4, a detection unit 5 having a first camera 5a and a second camera 5b, and a control and evaluation unit 6. In alternative embodiments of the device 1, the detection device 5 may have only a single camera, however, e.g. only the first camera 5a.

The projection device 4 has an illuminating unit 7 unit and a projection unit 8. In this case the illuminating unit 7 comprises, e.g., a light source in the form of a laser that emits visible green light having a wavelength of approximately 530 nm. The illuminating unit 7 may also have a light source other than a laser, however, e.g. one or a plurality of LEDs, a mercury vapor lamp, or the like. In alternative embodiments, the illuminating unit 7 may also have a light source that emits light at a wavelength outside of the visible spectrum, e.g. in the UV, NIR, or IR spectrum. In alternative embodiments, the illuminating unit 7 may also have one or a plurality of optical elements for beam shaping or beam collimation, e.g. in the form of mirrors and/or lenses. These optical elements are then typically arranged between the light source of the illuminating unit 7 and the mirror surface of the projection unit 8.

In this case the projection unit 8 comprises a housing 9, a metal substrate layer 10 that is deformable, or is at least deformable in regions, that forms a freeform mirror surface 10a, and that closes the housing 9 in regions, a connecting layer 11 that is arranged on a back side of the substrate layer 10 facing away from the freeform mirror surface 10a, and an actuating unit 12 having a first actuator 12a and a second actuator 12b. In alternative embodiments, a "conventional" mirror surface, for example a flat, parabolic, or hyperbolic mirror surface, may be provided instead of the freeform mirror surface 10a. In alternative embodiments, the actuating unit 12 may also have only a single actuator or may have more than two actuators. The actuating unit 12 deforms the freeform mirror surface 10a, or at least deforms it in regions. By deforming, or at least deforming regions of, the substrate layer 10 or the freeform mirror surface 10a, light L emitted by the illuminating unit 7 and reflected on the freeform mirror surface 10a in the object space 2 may be shaped into different spatially structured light patterns that may then be projected onto the three-dimensional contour 3 to be measured.

In the present example, the metal substrate layer 10 is made, e.g. of aluminum and has a maximum thickness of less than 0.15 mm. In alternative embodiments, the substrate layer 10 may also be made of other metals or metal alloys and/or may have a different maximum thickness, e.g. a greater maximum thickness. For forming the freeform mirror surface 10a, however, materials are preferably used that have the greatest possible and most constant possible reflectivity across the broadest possible spectrum. The freeform mirror surface 10a may also have a microstructuring 19 that shall be described in greater detail below (see FIGS. 3 and 4). A surface area of the freeform mirror surface 10a in this case is approx. 20 cm². The surface area of the freeform mirror surface 10a may also just as easily be larger or smaller than 20 cm². The freeform mirror surface 10a has a round, oval, elliptical, or rectangular shape. It is understood, however, that the freeform mirror surface 10a may also have other shapes.

The freeform mirror surface 10a may have any desired three-dimensional contour. Normally it is completely continuous or at least continuous section-wise or is continuously differentiatable. The three-dimensional contour of the freeform mirror surface 10a may be selected or produced depending on the type of light pattern it is to shape in the object space 2. For example, the three-dimensional contour of the freeform mirror surface 10a may be embodied for shaping periodic or aperiodic stripe patterns. In principal, however, any desired types of spatially structured light patterns may be shaped with freeform mirror surfaces of the type described here, depending on the embodiment or shape of their surface contour. By deforming the three-dimensional contour of the freeform mirror surface 10a by means of the actuating unit 12, the spatially structured light patterns thus shaped may then be modified in a variety of ways.

The connecting layer 11 is arranged between the actuators 12a, 12b of the actuating unit 12. It transmits deforming forces from the actuators 12a, 12b of the actuating unit 12 onto the deformable substrate layer 10, and in particular onto the deformable freeform mirror surface 10a. The connecting layer 11 may comprise, e.g. at least one adhesive layer and/or at least one metal layer. This metal layer may be embodied e.g. as a solder layer or may be a metal film. A maximum thickness of the connecting layer 11 may be, for example, less than 1 mm, less than 0.5 mm, or less than 0.2 mm. The thickness of the connecting layer 11 may even be greater, however. But in general it is advantageous when the connecting layer 11 is as thin as possible. In this way the deformation of the substrate layer 10 and the freeform mirror surface 10a by actuating the actuators 12a, 12b may be adjusted very precisely and with good reproducibility. Instead of the connecting layer 11 illustrated here, it is also possible to provide only individual connecting elements (not shown) that are each arranged between one of the actuators 12a, 12b and the substrate layer 10 and that are designed for transmitting a deforming force between the actuators 12a, 12b and the substrate layer. These connecting elements may then likewise be made, e.g., of adhesive or metal.

The actuators 12a and 12b of the actuating unit 12 are arranged in the housing 9 and are supported e.g. on a bottom 9a of the housing 9. The housing 9 may be made e.g. of plastic, metal, or even another material. The actuators 12a and 12b may have an extension adjustable in a direction perpendicular or essentially perpendicular to the freeform mirror surface 10a. For example, the actuators 12a, 12b may each comprise one or a plurality of piezo elements, the extension of which is adjustable, with precision down to the nanometer, perpendicular or essentially perpendicular to the freeform mirror surface 10a using a piezo voltage. In alternative embodiments, the actuators 12a, 12b of the actuating unit 12 may also each have a linear motor or a mechanical actuating unit that may be moved via a linear motor. The length or the extension of the actuators 12a, 12b may be adjusted in the direction perpendicular or essentially perpendicular to the freeform mirror surface 10a, possibly by up to a few hundred micrometers or by up to a few millimeters, depending on the geometry of the freeform mirror surface 10a, in particular depending on its lateral extension. To stabilize the projection unit 8, an intermediate space 18 that is embodied between the connecting layer 11 and the bottom 9a of the housing 9 and in which the actuators 12a, 12b are arranged may be additionally filled with an elastic or at least somewhat elastic fill material. It is also possible to provide an additional layer instead of this intermediate space 18. The actuators 12a, 12b may then be embedded, e.g., in this additional layer.

The different actuators 12a, 12b of the actuating unit 12 are spatially separated from one another in a direction parallel or essentially parallel to the freeform mirror surface 10a such that a deforming force that may be transmitted from the actuators 12a, 12b onto the substrate layer 10 or onto the freeform mirror surface 10a acts on or can act on different positions of the freeform mirror surface 10a. Thus the deformation of the freeform mirror surface 10a is particularly precisely adjustable and reproducible. In the exemplary embodiment of the actuating unit 12 illustrated here, a maximum distance between adjacent actuators 12a, 12b is less than 1 cm, for example. However, in alternative embodiments, the maximum distance between adjacent actuators may also be less than 1 mm, less than 0.5 mm, or less than 0.1 mm.

The cameras 5a, 5b of the detection unit 5 may, each have, e.g., one or more CCD sensors or CMOS sensors. Alternatively or in addition, the detection unit 5 may also comprise one or more other types of image sensors, however.

The control and evaluation unit 6 typically comprises a programmable processor, e.g. in the form of one or more microprocessors and/or one or more FPGAs or the like. The control and evaluation unit 6 is designed to control at least the actuating unit 12 and the detection unit 5, that is, in particular the actuators 12a, 12b and the cameras 5a, 5b. In the exemplary embodiment illustrated here, the control and evaluation unit 6 is additionally designed to control the illuminating unit 7. The control and evaluation unit 6 is connected to the illuminating unit 7, the actuators 12a, 12b, and the cameras 5a, 5b via wired or wireless communication connections 13.

The control and evaluation unit 6 is designed to adjust the length and/or the change in length of the actuators 12a, 12b perpendicular or essentially perpendicular to the freeform mirror surface 10a and thus to form or deform the surface shape or three-dimensional contour of the freeform mirror surface 10a in an extremely precise and reproducible manner. The control and evaluation unit 6 is preferably designed to control the points in time at which each of the actuators 12a, 12b is actuated and/or at which the image sensors of the cameras 5a, 5b are exposed to light.

The control and evaluation unit 6 is preferably also designed to control the actuators 12a, 12b independently of one another, i.e. to control the lengths and/or changes in length of the actuators 12a, 12b and/or the point in time of these changes in length independently of one another. However, depending on the geometry of the substrate layer 10 or of the freeform mirror surface 10a and on the maximum change in length of the actuators 12a, 12b, it is possible to set limits, e.g. to prevent the deformation from being too severe or to prevent damage to the substrate layer 10 and the freeform mirror surface 10a.

FIGS. 2a and 2b illustrate merely schematically how a spatially structured light pattern formed by the projection unit 8 in the object space 2 may be changed by deforming the freeform mirror surface 10a. Recurring features are identified with the same reference numbers here and in the following.

In FIG. 2a, light L emitted by the illuminating unit 7 is reflected on the freeform mirror surface 10a and projected into the object space 2, e.g., onto the three-dimensional contour 3 from FIG. 1 arranged in the object space 2. In FIG. 2a, the control and evaluation unit 6 controls the actuators 12a, 12b such that the latter have first lengths 14a, 14b perpendicular or essentially perpendicular to the freeform mirror surface 10a. The freeform mirror surface thus assumes a first surface shape 15a in FIG. 2a. The first surface shape 15a of the freeform mirror surface 10a shapes the light L, emitted by the illuminating unit 7, in the object space 2 into a first stripe pattern 16a, which here by way of example is shown as a periodic stripe pattern having a first period length. It is understood that the freeform mirror surface 10a may also be embodied for shaping other light patterns.

In FIG. 2b, the light L emitted by the illuminating unit 7 is again reflected on the freeform mirror surface 10a and projected into the object space 2, e.g. onto the three-dimensional contour 3 from FIG. 1 that is arranged in the object space 2. In FIG. 2b, the control and evaluation unit 6 now controls the actuators 12a, 12b such that the latter have second lengths 17a, 17b, perpendicular or essentially perpendicular to the freeform mirror surface 10a, that differ from the first lengths 14a, 14b illustrated in FIG. 2a. The freeform mirror surface thus assumes a second surface shape 15b that differs from the first surface shape 15a illustrated in FIG. 2a. The second surface shape 15b of the freeform mirror surface 10a shapes the light L, emitted by the illuminating unit 7, in the object space 2 into a second stripe pattern 16b that is different from the first stripe pattern 16b illustrated in FIG. 2a. For example, the second stripe pattern 16b may have a second period length that differs from the first period length of the first stripe pattern 16a. Alternatively or in addition, the second stripe pattern 16b may also be, e.g., aperiodic or the like.

It is understood that by deforming the actuators 12a, 12b of the actuating unit 12 in this manner, a great number of different spatially structured light patterns may be formed and projected e.g. onto the three-dimensional contour 3 in the object space 2. The control and evaluation unit 6 and the actuators 12a, 12b may be embodied, e.g., such that a frequency with which the lengths of the actuators 12a, 12b and thus a spatial structure of the spatially structured light patterns shaped in the object space 2 may be changed, may be at least 100 Hz, at least 1 kHz, or at least 10 kHz.

Figure 3:
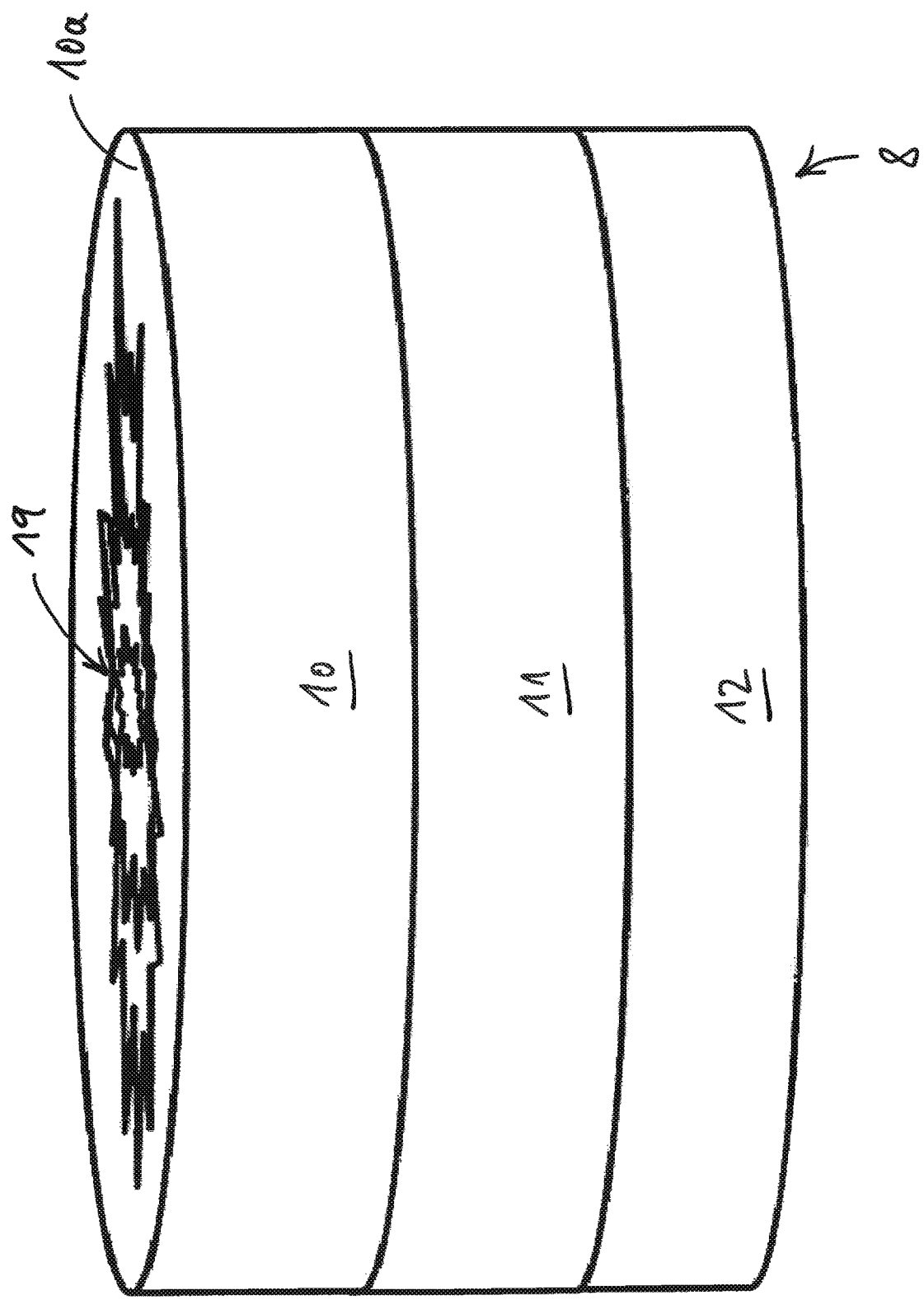
FIG. 3 is a schematic perspective elevation of a projection unit of the projection device from FIG. 1; and, FIG. 4 schematically depicts a surface profile of the deformable mirror surface from FIG. 3.

FIG. 3 provides a perspective schematic elevation of a modified embodiment of the projection unit 8. The projection unit 8 according to FIG. 3 again comprises the substrate layer 10 having the freeform mirror surface 10a, the connecting layer 11, and the actuating unit 12 in the form of an additional layer, in which layer the actuators may be embedded, for example. Alternatively, the actuating unit 12 according to FIG. 3 may also be provided in the form of one or more piezoelectric layers. Microstructuring 19 of the freeform mirror surface 10a is also highlighted in FIG. 3. The microstructuring 19 may comprise, e.g., local elevations and depressions in the freeform mirror surface 19. These local elevations and depressions may comprise height variations, perpendicular or essentially perpendicular to the mirror surface, of up to 10 µm, up to 20 µm, up to 50 µm, up to 100 µm, up to 200 µm, or up to 500 µm, for example. Additionally or alternatively, these height variations or local height variations may have an amplitude of at least 0.5 µm, of at least 1 µm, of at least 5 µm, of at least 10 µm, of at least 20 µm, of at least 50 µm, or of at least 100 µm in a direction perpendicular to the mirror surface. Parallel to the mirror surface, these height variations in the mirror surface may have dimensions of up to up to 100 µm, up to 200 µm, up to 500 µm, up to 1 mm, up to 5 mm, or up to 10 mm. The microstructuring shapes or shapes spatially high-frequency structures of the spatially structured light pattern to be projected into the object space 2.

Figure 4:
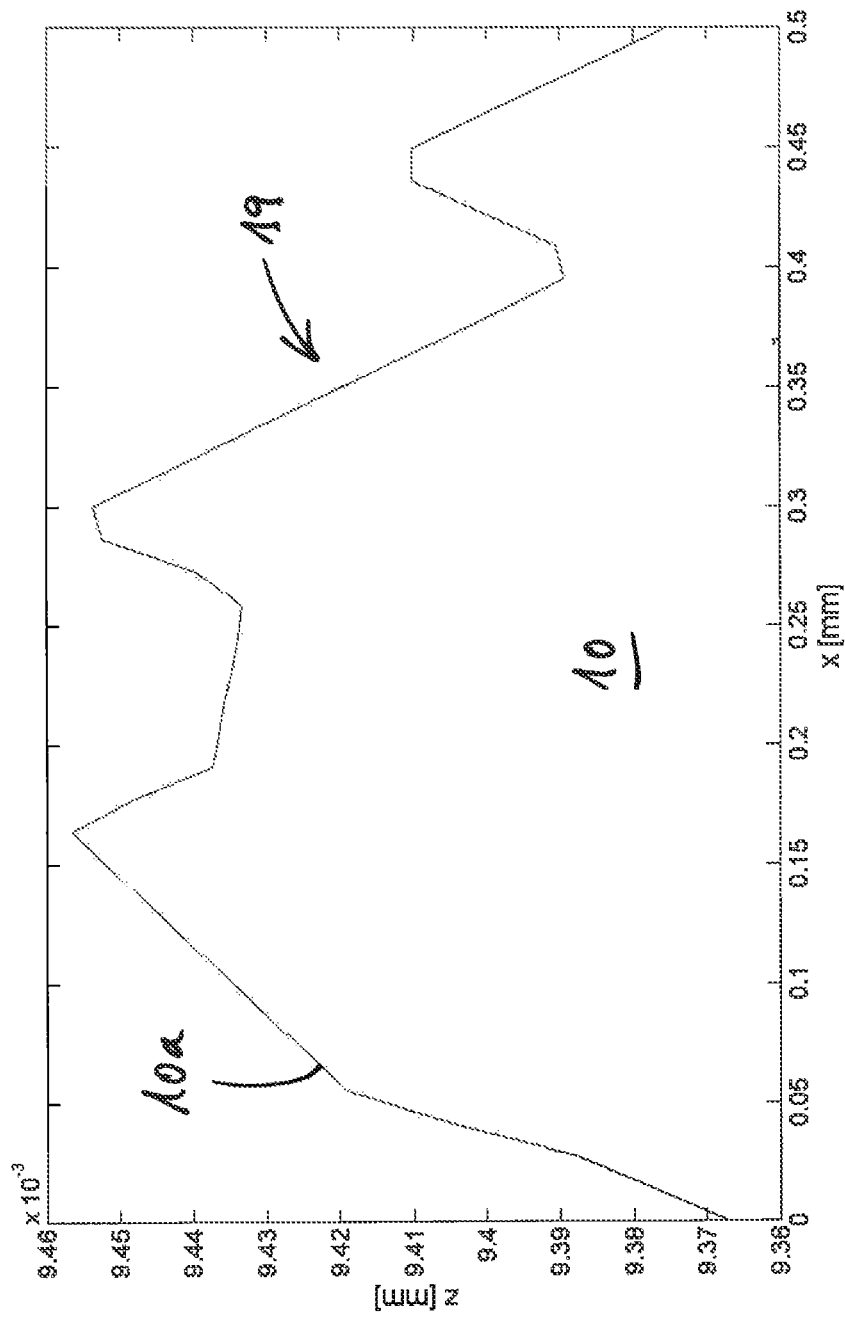

FIG. 4 illustrates by way of example a section through the freeform mirror surface 10a of the projection unit 8 according to FIG. 3 having a local height profile of the microstructuring 19 of the freeform mirror surface 10a, wherein the sectional plane runs perpendicular to the illustration plane in FIG. 3. It may be seen from FIG. 4 that the height of the freeform mirror surface 10a has height variations of approx. 10 micrometers in the lateral direction, i.e. parallel or essentially parallel to the freeform mirror surface 10a (this is the x-direction in FIG. 4) across a length of 0.5 mm and additionally has height variations of less than 1 micrometer locally across lengths of approximately 50 micrometers.

A method for contactless detection of the three-dimensional contour 3 may be executed with the device 1 according to FIG. 1. This method comprises at least the following steps:

The light L emitted by the illuminating unit 7 is reflected on the freeform mirror surface 10a and shaped successively into different spatially structured light patterns. This plurality of different spatially structured light patterns is projected onto the three-dimensional contour 3 in the object space 2. Examples of such spatially structured light patterns are the light patterns 16a and 16b illustrated in FIGS. 2a and 2b. For example, for executing the method, several hundred or several thousand different spatially structured light patterns may be successively projected onto the three-dimensional contour 3. The shaping of the different spatially structured light patterns comprises the aforesaid deformation of the freeform mirror surface 10a by means of changing the lengths of the actuators 12a, 12b, which are controlled by the control and evaluation unit 6.

The control and evaluation unit 6 controls the actuators 12a, 12b and the cameras 5a, 5b synchronously such that the cameras 5a, 5b record at least one image of the contour 3 with the spatially structured light pattern projected onto the contour 3 for each of the plurality of different spatially structured light patterns projected onto the three-dimensional contour 3. The control and evaluation unit 6 is designed to calculate the spatial structure of the contour 3 based on image data from these images recorded by means of the cameras 5a, 5b.

To this end, the control and evaluation unit 6 identifies, for each of a plurality of object points 3a, 3b, 3c on the contour 3, a pair of points in an image plane 20a of the first camera 5a and in an image plane 20b of the second camera 5b that correspond to one another and to the specific object point 3a, 3b, 3c. For example, in FIG. 1 the point 3c' in the image plane 20a of the first camera 5a and the point 3c" in the image plane 20b of the second camera 5b form such a pair of points that correspond to one another and to the object point 3c on the contour 3. As mentioned in the foregoing, potential methods for identifying the points 3c', 3c" in the image planes 20a, 20b of the cameras 5a, 5b that correspond to one another are described, for example, in WO2015022384A1 and DE102012013079A1. Naturally other methods, e.g. other methods known from the prior art, may also be used to identify the points 3c', 3c" in the image planes 20a, 20b of the cameras 5a, 5b that correspond to one another. Then, based on the known spatial arrangement of the image planes 20a, 20b of the cameras 5a, 5b, depth information and therefore spatial coordinates of the point 3c on the contour 3 may be calculated for the pair of points 3c', 3c" using triangulation. In like manner the spatial coordinates of the object points 3a, 3b and a plurality of other object points on the contour 3 may be calculated.

In one modified embodiment, only the first camera 5a, for example, is used. In this case the control and evaluation unit 6 may then determine a virtual projection plane 21 from which the light L for shaping the spatially structured light patterns is projected into the object space 2 and onto the contour 3. In this case, the control and evaluation unit 6 then identifies, for each of the object points 3a, 3b, 3c on the contour 3, a pair of points in the image plane 20a of the first camera 5a and in the virtual projection plane 21 that correspond to one another and to the specific object point 3a, 3b, 3c. For example, in FIG. 1 the point 3c' in the image plane 20a of the first camera 5a and the point 3c''' in the projection plane 21 form such a pair of points that correspond to one another and to the object point 3c on the contour 3.

What is claimed is:

1. A projection device comprising:
an illuminating unit for emitting light; and,
a projection unit having a mirror surface, the projection unit configured to project the light emitted by the illuminating unit using the mirror surface into an object space and to shape it into different spatially structured light patterns in the object space;
wherein
the mirror surface is deformable, at least in regions, and in that the projection unit, for shaping the different spatially structured light patterns in the object space, has at least one actuator for deforming the mirror surface, at least in regions; and
wherein the mirror surface has a fixed microstructure configured for shaping high-frequency spatial structures of the spatially structured light patterns, and wherein the fixed microstructure is formed on the mirror surface separately from the deforming caused by the at least one actuator.

2. The projection device according to claim 1, wherein the mirror surface for shaping the spatially structured light patterns includes a freeform mirror surface.

3. The projection device according to claim 1, wherein a direction perpendicular to the mirror surface the fixed microstructure comprises local height variations having an amplitude of one of: up to 10 μm, up to 20 μm, up to 50 μm, up to 100 μm, up to 200 μm, or up to 500 μm.

4. The projection device according to claim 3, wherein a direction parallel to the mirror surface the height variations or the local height variations of the fixed microstructure extend over one of: up to 100 μm, up to 200 μm, up to 500 μm, up to 1 mm, up to 5 mm, or up to 10 mm.

5. The projection device according to claim 1, wherein a direction perpendicular to the mirror surface the fixed microstructure comprises local height variations having an amplitude of one of: at least 0.5 μm, at least 1 μm, at least 2 μm, at least 5 μm, at least 10 μm, at least 20 μm, at least 50 μm, or at least 100 μm.

6. The projection device according to claim 1, wherein, for configuring the mirror surface, the projection unit has a substrate layer, in particular a metal substrate layer, having a thickness of at most 1 mm.

7. The projection device according to claim 6, wherein, on a back side of the substrate layer facing away from the mirror surface, the projection unit has at least one connecting element or at least one connecting layer, the at least one connecting element or the at least one connecting layer being arranged for transmitting a deforming force from the at least one actuator to the substrate layer between the at least one actuator and the substrate layer.

8. The projection device according to claim 7, wherein the at least one connecting layer comprises at least one adhesive layer or at least one metal layer.

9. The projection device according to claim 1, wherein the at least one actuator comprises at least one piezo element, at least one linear motor, or at least one actuating unit that is capable of being driven by a linear motor.

10. A device for contactless detection of a three-dimensional contour, comprising:
a projection device comprising an illuminating unit for emitting light; and, a projection unit having a mirror surface, the projection unit configured to project the light emitted by the illuminating unit using the mirror surface into an object space and to shape it into different spatially structured light patterns in the object space, wherein the mirror surface is deformable, at least in regions, and in that the projection unit, for shaping the different spatially structured light patterns in the object space, has at least one actuator for deforming the mirror surface, at least in regions and wherein the mirror surface has a fixed microstructure configured for shaping high-frequency spatial structures of the spatially structured light patterns, and wherein the fixed microstructure is formed on the mirror surface separately from the deforming caused by the at least one actuator;
at least one camera, for recording images of an object arranged in the object space with the different spatially structured light patterns projected onto the object by means of the mirror surface; and,
an evaluation unit for determining a three-dimensional contour of an object arranged in the object space based on image data from images of the object recorded using the at least one camera, with the different spatially structured light patterns projected onto the object using the mirror surface.

11. The device according to claim 10, further comprising:
a control unit for controlling the at least one actuator and for controlling the at least one camera;
the control unit being configured to control the at least one actuator and the at least one camera, such that the at least one camera, for each spatially structured light pattern of the different spatially structured light patterns that is projected by means of the mirror surface onto the object arranged in the object space, records at least one image of the object with the spatially structured light pattern projected onto the object.

12. The device according to claim 10, wherein, for detecting the three-dimensional contour of the object arranged in the object space, the evaluation unit is configured, for a plurality of object points of the object, based on the image data of the images recorded using the at least one camera,
to identify pairs of points corresponding to one another and to a specific object point in an image plane of the camera or of a first camera and in another plane, wherein the other plane
a) is an image plane of a second camera, or,
b) is a virtual projection plane associated with the mirror surface, and
to determine depth information using triangulation depending on positions of the points corresponding to one another and to the specific object point in the image plane and in the other plane.

13. A projection method comprising the steps of:
shaping a first spatially structured light pattern in an object space by reflecting light on a mirror surface having a first surface shape, wherein the mirror surface has a fixed microstructure configured for shaping high-frequency spatial structures of the spatially structured light patterns;
deforming, at least region-wise, the mirror surface so that the mirror surface assumes a second surface shape different from the first surface shape; and,
shaping a second spatially structured light pattern in the object space that is different from the first spatially structured light pattern by reflecting light on the mirror surface having the second surface shape, wherein the mirror surface contains the fixed microstructure for shaping high-frequency structures of the spatially structured light patterns, and wherein the fixed microstructure are formed on the mirror surface separately from the deforming caused by the at least one actuator.

14. The projection method according to claim 13, wherein deforming the mirror surface is accomplished by means of at least one actuator, by changing a piezo voltage of a piezo element or by adjusting a linear motor.

15. The projection method according to claim 13, wherein the mirror surface is deformed at different positions of the mirror surface simultaneously.

16. The projection method according to claim 15, wherein the mirror surface is deformed at different positions of the mirror surface arranged rotationally symmetrical to one another.

17. A method for contactless detection of a three-dimensional contour, comprising the steps:
projecting different spatially structured light patterns onto an object arranged in an object space in accordance with the method according to claim 13;
recording images of the object with the different spatially structured light patterns projected onto the object using at least one camera; and,
determining a three-dimensional contour of the object based on image data of the images recorded by means of the at least one camera.

18. The method according to claim 17, wherein the deforming of the mirror surface for shaping the different spatially structured light patterns and the recording of the images of the object by means of the at least one camera, are accomplished synchronously in that the at least one camera, for each of the different spatially structured light patterns that is projected onto the object, records or record at least one image of the object with the spatially structured light pattern projected onto the object.

19. The method according to claim 17, wherein, for a plurality of object points of the object, based on the image data of the images recorded by means of the at least one camera,
pairs of points corresponding to one another and to a specific object point in an image plane of the camera or of a first camera and in another plane are identified, wherein the other plane
a) is an image plane of a second camera, or,
b) is a virtual projection plane associated with the mirror surface, and
depth information is determined using triangulation depending on positions of the points corresponding to one another and to the specific object point in the image plane and in the other plane.

* * * * *